Dec. 15, 1964
E. SIRTL
3,161,474
METHOD FOR PRODUCING HYPERPURE SEMICONDUCTING
ELEMENTS FROM THEIR HALOGEN COMPOUNDS
Filed June 9, 1961
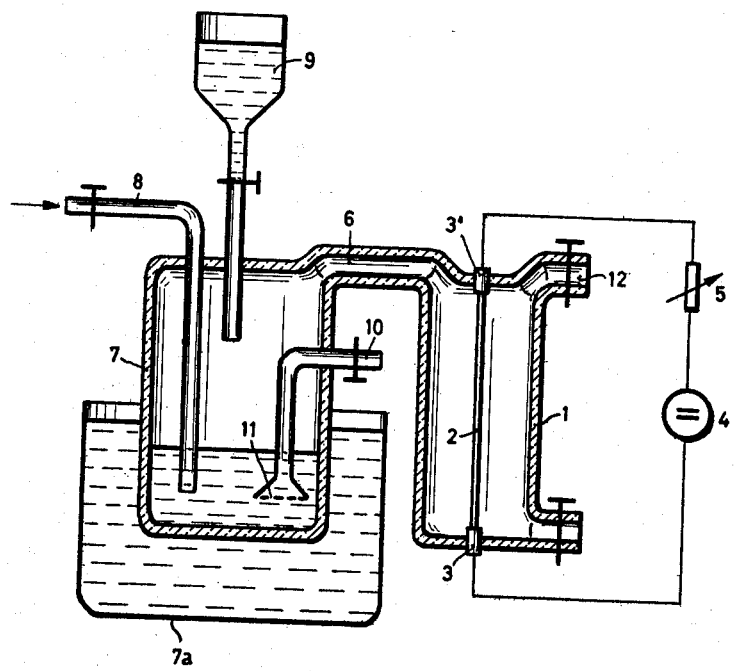

3,161,474
METHOD FOR PRODUCING HYPERPURE SEMI-CONDUCTING ELEMENTS FROM THEIR HALOGEN COMPOUNDS
Erhard Sirtl, Munich, Germany, assignor to Siemens & Halske Aktiengesellschaft, Berlin, Germany, and Munich, Germany, a German corporation
Filed June 9, 1961, Ser. No. 116,041
Claims priority, application Germany June 21, 1960
8 Claims. (Cl. 23—223.5)

My invention relates to the production of semiconducting elements, such as silicon or germanium by pyrolytically (i.e., thermally or electro-thermally) reducing their gaseous or gasified halogen compounds and precipitating the elements in crystalline form.

According to a preferred method of this type, a mixture of the purified halogen compound and pure hydrogen is directed toward the surface of a carrier body consisting of the same semiconductor material as the one being precipitated and heated to a high temperature sufficient for dissociating the semiconductor element from the gas and precipitating it upon the carrier surface. Another known method of this type involves precipitating the semiconductor material in crystalline condition from its halogen compound by subjecting the gas to the thermal action of an electric gas discharge between electrodes.

As a rule, the purity of the semiconductor substance thus produced increases with increased purity of the gases being used. Several methods have therefore been developed for purifying the halogen compounds to be used for pyrolytic production of elemental silicon or germanium. A known and in many cases a very effective purifying method is constituted by partial hydrolysis of the particular semiconductor-halogen compound. Such partial hydrolysis requires adding to the particular semiconductor-halogen compound, when in liquid condition, a slight quantity of water in finely distributed condition, for example by mixing the liquid compound with pure, moist paper powder or by introducing into the liquid compound a humid, inert gas. This has the effect of forming amorphous insoluble hydrated oxides, for example silicic acid gels in the case of silicon-halogen containing compounds, which in some cases are capable of imposing a considerable sorptive effect upon the traces of impurities contained in the silicon-halogen compound, thereby bonding such impurities to the hydrated oxides. (It may be mentioned that the particular semiconductor-halogen compounds for the above-mentioned purposes are commercially available to the semiconductor-producing industry in form of relatively pure substances because these compounds, after being produced, are generally freed by filtration, distillation and other separating processes from the main portion of any impurities, that may be contained in the compound that may have originated from the manufacturing process.) After subjecting the semiconductor-halogen compound to the above-mentioned partial hydrolysis, the product is subjected to filtration and/or distillation in order to separate the semiconductor-halogen compound from the resulting impurities-sorbing hydrated oxides (hydroxides) which possess an extremely slight volatility. The purified halogen compound is then converted into gaseous condition by evaporation and then employed for the production of the semiconducting element in one of the ways mentioned above.

The invention is based upon results of investigations showing that the method of partial hydrolysis, if carried out in the known manner, is not equally effective in all cases. While, in the hydrolysis of silicon tetrachloride ($SiCl_4$), the silicic acid which constitutes the hydrated oxides being formed (or more accurately, the resulting silica gel) possesses a high sorptive force for various impurities, experience has shown that the hydrated oxides resulting from partial hydrolysis of other silicon-halogen compounds, for example of $SiHCl_3$, are considerably less effective.

It is therefore an object of my invention to provide a method of purifying semiconductor-halogen compounds by partial hydrolysis which excels the known methods in purifying action also when applied to semiconductor-halogen compounds other than $SiCl_4$.

To this end, and in accordance with a feature of my invention, relating to the pyrolytic precipitation of semiconducting elements from their gaseous compounds previously purified by partial hydrolysis in the liquid state, I add, prior to performing the partial hydrolysis, to the still liquid semiconductor-halogen containing compound, a metal compound soluble in the liquid halogen compound and having a pyrolytic dissociation temperature higher than the semi-conductor-halogen compound. The added metal compound must further satisfy the condition that it hydrolyzes more readily than the semiconductor-halogen compound under formation of non-volatile hydrated oxides which are capable of bonding any present impurities to a higher degree than the hydrated oxides of the semiconductor halogen compound. After thus subjecting the liquid mixture to partial hydrolysis, in the presence of the above-mentioned metal compound, the halogen compound is converted into gaseous condition and then processed pyrolytically (i.e., thermally or electro-thermally; that is, by electric gas discharge) at a temperature at which a pyrolytic dissociation of the metal compound does not yet take place.

Examples of metal compounds suitable for the purposes of the invention and eminently satisfying all above-mentioned requirements are titanium tetrachloride ($TiCl_4$) and aluminum bromide ($AlBr_3$). For instance, when halogen silane ($SiH_4$) or halogen germane ($GeH_4$) are to be used as starting materials and are still in liquid condition, slight quantities of titanium tetrachloride $TiCl_4$) or aluminum bromide ($AlBr_3$) may be added. Then, during the subsequent hydrolysis the corresponding hydrated oxides, namely, hydrated titanium oxide (titanium hydroxide), or aluminum hydroxide, become precipitated with preference and are then capable of bonding any impurities to a considerably greater extent than the oxide-hydrates of silicic acid bases. The process affords the following advantages:

(a) Since the formation of the oxide-hydrates of these substances occur kinetically and thermodynamically in preference to the hydrolysis products of the silicon or germanium halogen compounds, a chemisorptively favorable precipitation can be obtained under all circumstances, this not being true for the hydrolysis of halogen silanes or halogen germanes.

(b) Furthermore, these additions enter into addition-type compounds with a great variety of impurities of the silicon-halogen or germanium-halogen compounds, for example with $AlBr_3 \cdot POCl_3$, $TiCl_4 \cdot PCl_3$, $TiCl_4 \cdot SCl_4$, $LiAlBr_4$ and others. For that reason, the added metal compounds tend to preferentially sorb these impurities during formation of the oxide-hydrates of $TiCl_4$ or $AlBr_3$.

(c) Since the metal compounds to be used are greatly diluted in the liquid halogen compound to be purified, due to the great solubility of the metal compounds, the formation of the surface-active hydrolysis components is distributed over the entire volume of the halogen compound to be purified. This further promotes the tendency of building the impurities into the oxide-hydrates being formed.

(d) During pyrolytic production of silicon at the usual temperatures up to about 200° C. beyond the melting point of silicon, said melting point being 1420° C.; aluminum and titanium are not built into the substance for thermodynamic reasons, if $TiCl_4$ or $AlBr_3$ simultaneously with the hydrogen compound to be used for silicon production enters into the reaction vessel in which the pyrolytic process is being performed. Consequently, the resulting semiconductor product is also free of traces of aluminum and titanium. Due to the lower pyrolytic production temperatures of germanium, the conditions are even more favorable for germanium.

(e) The high purifying action of the metal compounds added according to the invention to the liquid halogen compound, in conjunction with the properties mentioned above under (d), make it unnecessary to separate any excess of purifying substance from the semiconductor-halogen compound to be purified. Consequently, a fractional distillation or other separating method need not be employed. The liquid mixture, subjected to partial hydrolysis, can rather be mixed, upon termination of the hydrolysis, with hydrogen gas. By introducing the hydrogen into the liquid mixture, the hydrogen becomes laden with the vapor of the halogen compound and can be supplied to the reaction vessel used for the production of the elemental semiconductor and provided with a heated carrier body of the same semiconductor material as the one to be precipitated.

The method according to the invention may be performed in accordance with the following example.

The silicon-halogen or germanium-halogen compound to be purified is mixed with about $10^{-2}$, at most $10^{-1}$, mole percent $TiCl_4$ or $AlBr_3$ per mole of the halogen compound to be purified. Thereafter, moisture-laden compressed air, nitrogen or hydrogen is introduced for about 10 minutes into the liquid through a screen or sifter plate consisting, for example, of glass or quartz, which is immersed into the liquid. The liquid may be cooled to prevent excessive evaporation. The resulting hydrated oxide evolves in form of a flocculating precipitate which is permitted to settle. Thereafter, the purified silicon-halogen or germanium-halogen compound can be decantered from above the settled hydroxide. The purified halogen compound is then converted into a gaseous state as usual and is employed for the above-mentioned production of the semiconductor material. If desired, however, the reaction gas mixture to be employed for the pyrolytic production of the semiconductor may also be directly produced from the mixture subjected to the partial hydrolysis. This is the case in the embodiment of processing equipment shown on the accompanying drawing.

The illustrated apparatus components consist preferably of quartz or glass. They are shown in simplified form. For producing a semiconductor substance from a purified silicon-halogen compound, for example, $SiHCl_3$, the precipitation is effected within a reaction vessel 1 in which a carrier body of hyperpure silicon is mounted. This carrier is heated to the pyrolytic processing temperature, for example electrically. In the illustrated embodiment, a wire or rod shaped carrier 2 of silicon is used which is mounted vertically in the reaction vessel 1 by means of electrodes 3 and 3' consisting of spectral carbon and coated with hyperpure silicon. The carrier rod 2 is supplied with electric current from a current source 4 through a controllable stabilizing resistor 5. The current intensity is such as to maintain the silicon rod 2 at the required incandescent temperature, for example of about 900° C. The reaction vessel 1 is connected by a conduit 6 with an evaporator vessel 7 in which a liquid silicon-halogen compound, for example $SiHCl_3$ is located. A pipe 8 immersed in the liquid compound supplies hydrogen gas during the pyrolytic precipitation process. The hydrogen becomes charged with the vapor of the halogen compound. The gas mixture, composed of the silicon-halogen compound and hydrogen, is supplied through conduit 6 to the reaction vessel 1.

For replenishing the consumed silicon-halogen compound, a storage vessel 9 serves to introduce new silicon-halogen compound into the evaporator vessel 7. This quantity of silicon-halogen compound in vessel 9 is already provided with an addition of $TiCl_4$ or $AlBr_3$. The liquid in the evaporator vessel 7 likewise contains such a metal-salt addition. The evaporator vessel 7 is immersed in a temperature regulating bath 7a, a pipe 10 enters from above into the silicon-halogen compound liquid contained in the evaporator vessel 7 and is provided at its immersed opening with a grid or screen plate 11 consisting of quartz or glass.

The process is commenced by subjecting the silicon-halogenide $SiHCl_3$ with the added $AlBr_3$ or $TiCl_4$ in the evaporator vessel 7 to partial hydrolysis. For this purpose a moisture-laden hydrogen gas is introduced through the pipe 10. The process of partial hydrolysis is then performed in the manner described above. After termination of the hydrolysis process, the supply of the moist hydrogen gas is discontinued. In the meantime the carrier 1 has been traversed by electric current and dry hydrogen gas has been supplied through conduit 12 into the reaction vessel 1. Under these conditions the heated carrier rod 2 is adjusted to the glowing temperature required for the pyrolytic production of silicon. Then a current of dry hydrogen gas is passed through the pipe 8 into the evaporator vessel 7 and thence through the conduit 6 into the reaction 1. Now the silicon precipitation upon the carrier 2 takes place in the known manner. If during the precipitation process a new amount of $SiHCl_3$ is introduced into the evaporator vessel 7, it is advisable to interrupt the pyrolytic precipitation process and to repeat the hydrolysis by supply of new moisture-laden hydrogen.

The above-described pyrolytic method for using the heated carrier 2 can also be substituted by a gas-discharge method for which purpose the reaction vessel 1 is to be provided with two electrodes between which the gas discharge is to occur. In this case the precipitation of silicon is concentrated upon the tip of the electrodes. This takes place when the temperature of the gas discharge just permits the thermoelectric conversion of the silicon-halogen compound with precipitation of the resulting silicon in liquid condition. Simultaneously, the two electrodes during continuing pyrolytic precipitation are gradually pulled away from each other so that only the tips of the electrodes, which, due to the continuing precipitation, continuously grow in length, remain heated to the high dissociation temperature of the silicon-halogen compound. Under such conditions the silicon, being precipitated in molten condition, will progressively freeze and thus gradually form a precipitated body of silicon without any original core.

The pyrolytic precipitation temperature being employed must not exceed the temperature value at which an appreciable dissociation occurs of the additive metal compound contained in the silicon-halogenide and entering, at least in trace amounts, into the reaction vessel 1. Tests have shown that a pyrolytic precipitation effected at a temperature somewhat more than 100° C. above the melting point of silicon, does not result in contamination of the precipitated silicon by simultaneously precipitated titanium or aluminum, even in cases where the $AlBr_3$ or $TiCl_4$ concentration reached the precipitation vessel in quantities amounting up to 0.1%.

However, when the pyrolytic processing temperature greatly exceeds a value of 200° C. above the melting point of silicon, i.e., 1620° C. (since silicon melts at 1420° C.) the precipitation of titanium or aluminum commences to become appreciable for thermodynamic reasons. Usually, however, the production of compact crystalline silicon rods by the above-mentioned pyrolytic method is effected at a temperature, which for a variety of reasons, does not appreciably exceed the melting point of the semiconductor material. When the pyrolytic process is thus performed in the known manner, a contamination by the added substances $TiCl_4$ or $AlBr_3$ is not to be expected. This has been fully confirmed by testing.

The substances $TiCl_4$ or $AlBr_3$ to be added to the liquid semiconductor halogen containing compound must satisfy some readily observable minimum requirements with respect to purity. Although these metal compounds constitute impurities themselves which would severely impair the properties of the semiconductor material if appreciable quantities of the substances could enter into the semiconductor material during the precipitation process, no such contamination will occur, if the above-mentioned upper temperature limit during the pyrolytic precipitation is observed. Consequently, the substances $AlBr_3$ or $TiCl_4$ do not act as impurities. However, the added $AlBr_3$ or $TiCl_4$ itself may contain impurities which are absorbed into the hydrated oxides formed by the partial hydrolysis, thus resulting in a reduction of the purifying action of the additional substance. It is therefore desirable to take care that the added $TiCl_4$ or $AlBr_3$ cannot appreciably increase the level of foreign elements of the semiconductor halogen compound to be purified and which, under the above-mentioned temperature conditions of pyrolytic precipitation could reach the silicon being precipitated. For this reason it is advisable to employ the purifying substances with the highest feasible degree of purity.

In order to obtain from industrially available $TiCl_4$ or $AlBr_3$ a substance that satisfies this purity requirement, the following method, according to another feature of my invention, may be employed. Approximately 10 mole percent $TiCl_4$ or $AlBr_3$ are dissolved in 1 mole of the semiconductor halogen compound to be purified. The liquid is then subjected in the above-described manner to partial hydrolysis for about 10 minutes, namely by introducing moist, inert gas. The decanted mixture is used as a standard solution and is supplied to the charges of semiconductor-halogen compounds to be purified, in a dilution of at least $1/1000$ and at most $1/10,000$.

Tests made with $SiCl_4$ of commercial quality, and comparative tests made with a $TiCl_4$-addition substance produced in accordance with the last-mentioned method, have shown that the above-described pyrolytic process readily results in silicon rods having a specific resistance of approximately 1000 ohm cm. (n-type conductance). The resistance value of the resulting silicon rod could be further improved up to 2000 to 4000 ohm cm. (p-type) by performing four passes of a crucible-free (floating) zone-melting method under vacuum. The carrier lifetime in the crystal specimens was approximately 400 to 600 $\mu$sec.

The suitability for hydrolysis is not inherent in all titanium halides or aluminum halides. For example, the fluorides, in contrast to bromides and iodides, of these elements have no or only a weakly developed hydrolyzing ability. However, the purification for example of silicon tetrachloride, silicochloroform and similar compounds, as well as the analogous germanium compounds can be performed by the compounds $AlCl_3$, as well as by $AlBr_3$ and $AlI_3$, and also by the compound $TiCl_4$, $TiBr_4$, $TiI_4$ and similar compounds. The use of all chlorides, bromides and iodides of titanium and aluminum are applicable in accordance with the teaching of this invention. $AlBr_3$ and $TiCl_4$ are preferred because of their high solubility in liquid silicon-halogen or germanium-halogen compounds. Other aluminum and titanium halides such as $AlCl_3$ are also operative.

The improvement of the present invention over the method, known as such, of applying a partial hydrolysis to liquid semiconductor-halogen compounds for purifying them prior to pyrolytic precipitation of the semiconductor substance becomes readily apparent by comparison with the degree of purification obtainable by the normal, partial hydrolysis. For example, if two equal quantities of liquid $SiCl_4$ are involved of which the one was not provided with an aluminum-halogen or titanium-halogen addition according to the invention, and which were both mixed with the same quantity of water for performing the partial hydrolysis, then, if the pyrolytic production of silicon from the two $SiCl_4$ specimens is performed in exactly the same manner (including the same expedients for preventing contamination during the pyrolytic process), the $SiCl_4$ prepared according to the invention will always result in a product having a considerably higher degree of purity.

The addition of the water, serving to effect hydrolysis, depends preferably upon the quantity of the added titanium-halogen or aluminum-halogen compound, and is preferably somewhat more than the quantity of water stoichiometrically required for complete hydrolysis of the addition. The quantity of water is best supplied by means of a humidity-laden flow of carrier gas entering into the liquid to be purified.

The effect obtained can best be recognized from a numerical example. $SiCl_4$ is provided with at most 0.01 mole percent of hydrolyzable titanium-halide or aluminum-halide according to the invention. This mixture is subjected to partial hydrolysis. Subsequently, elemental silicon is produced from the $SiCl_4$ thus treated. The purity degree of the silcon thus obtained (provided that new impurities are prevented during pyrolytic precipitation) exhibits a specific resistance of at least 500 ohm cm., in most cases the resistance actually is higher than 1000 ohm cm. at 20° C. The same quantity of $SiCl_4$, subjected to partial hydrolysis by means of the same quantity of water which has been carefully checked to have the same impurity content as the $SiCl_4$ used in the above-described test, but which, however, was not provided with a halide of titanium or aluminum, results under exactly the same conditions, inclusive of the same addition of water for effecting purification by partial hydrolysis, in a silicon product having a specific resistance of at most 50 ohm cm. It should be noted that the oxide hydrate obtained from the titanium or aluminum halides will chemically bond at least 100 times as many phosphorus atoms and at least 10 times as many boron atoms as the same quantity of silicon or germanium oxide hydrates. The same is also true of other impurities. The high purifying effect obtained herein makes it superfluous to employ the conventional, time-consuming purification processes, such as zone melting of the silicon or germanium produced.

The terms aluminum halides and titanium halides as used herein and in the appended claims is exclusive of aluminum fluorides and titanium fluorides.

It should be understood that while the foregoing disclosure relates only to preferred embodiments of the invention and that numerous modifications or alterations may be made without departing from the spirit and scope as set forth in the appended claims.

I claim:

1. In the method of producing a semiconducting element, selected from the group consisting of silicon and germanium, by pyrolytic dissociation and precipitation of a gasified halogen containing compound of the same element, previously purified by partial hydrolysis, the improvement comprising the steps of adding to the semiconductor-halogen containing compound when in liquid condition prior to performing the partial hydrolysis, a metal halide wherein the halogen of the metal halide is selected from those of the group consisting of chlorine, bromine and iodine, and the metal is selected from the group consisting of aluminum and titanium, said metal halide being soluble in said liquid semiconductor-halogen compound and having a pyrolytic dissociation temperature higher than that of the semiconductor-halogen containing compound, said metal halide being more readily hydrolyzable than the semiconductor-halogen containing compound; partially hydrolyzing the mixture and thereafter performing the pyrolytic precipitation of the semiconductor element at a pyrolytic temperature at which no conversion leading to precipitation of metal from said metal halide takes place.

2. In the method of producing a semiconducting element, selected from the group consisting of silicon and germanium, by pyrolytic dissociation and precipitation of a gasified halogen containing compound of the same element, previously purified by partial hydrolysis which forms an amorphous insoluble hydrated oxide, the improvement comprising the steps of adding titanium tetrachloride to the semiconductor-halogen containing compound when in liquid condition prior to performing the partial hydrolysis, said titanium tetrachloride being soluble in said liquid semiconductor-halogen compound and having a pyrolytic dissociation temperature higher than that of the semiconductor-halogen containing compound, said titanium tetrachloride being more readily hydrolyzable than the semiconductor-halogen containing compound; partially hydrolyzing the mixture, and thereafter performing the pyrolytic precipitation of the semiconductor element at a pyrolytic temperature at which no conversion leading to precipitation of titanium takes place.

3. In the method of producing a semiconducting element, selected from the group consisting of silicon and germanium, by pyrolytic dissociation and precipitation of a gasified halogen containing compound of the same element previously purified by partial hydrolysis which forms an amorphous insoluble hydrated oxide, the improvement comprising the steps of adding alumium bromide to the semiconductor-halogen containing compound when in liquid condition prior to performing the partial hydrolysis, said aluminum bromide being soluble in said liquid semiconductor-halogen compound and having a pyrolytic dissociation temperature higher than that of the semiconductor-halogen containing compound, said aluminum bromide being more readily hydrolyzable than the semiconductor-halogen containing compound, partially hydrolyzing the mixture, and performing the pyrolytic precipitation of the semiconductor element at a pyrolytic temperature at which no conversion leading to precipitation of aluminum takes place.

4. In the method of producing a silicon semiconductor by pyrolytic dissociation and precipitation of a gasified halogen containing compound of silicon, previously purified by partial hydrolysis which forms an amorphous insoluble hydrated oxide, the improvement comprising the steps of adding titanium tetrachloride to the silicon-halogen containing compound when in liquid condition prior to performing the partial hydrolysis, said titanium tetrachloride being added in a ratio from about $10^{-2}$ to about $10^{-1}$ mole percent per mole of said silicon-halogen containing compound to be purified, said titanium tetrachloride being soluble in said liquid silicon-halogen containing compound and having a pyrolytic dissociation temperature higher than that of said silicon-halogen containing compound, said titanium tetrachloride being more readily hydrolyzable than said silicon-halogen containing compound, partially hydrolyzing the mixture, and performing the pyrolytic precipitation of the semiconductor element at a pyrolytic temperature below 1620° C., whereby no conversion leading to precipitation of titanium takes place.

5. In the method of producing a silicon semiconductor element by pyrolytic dissociation and precipitation of a gasified halogen containing compound of silicon, previously purified by partial hydrolysis which forms an amorphous insoluble hydrated oxide, the improvement comprising the steps of adding aluminum bromide to the silicon-halogen containing compound when in liquid condition prior to performing the partial hydrolysis, said aluminum bromide being added in a ratio from about $10^{-2}$ to about $10^{-1}$ mole percent per mole of said silicon-halogen containing compound to be purified, said aluminum bromide being soluble in said liquid silicon-halogen compound and whose pyrolytic dissociation temperature is higher than that of the silicon-halogen containing compound, said aluminum bromide being more readily hydrolyzable than said silicon-halogen containing compound, partially hydrolyzing the mixture, and performing the pyrolytic precipitation of the semiconductor element at a pyrolytic temperature below 1620° C. whereby no conversion leading to precipitation of aluminum takes place.

6. In the method of producing a semiconducting element, selected from the group consisting of silicon and germanium, by pyrolytic dissociation and precipitation of a gasified halogen containing compound of the same element, previously purified by partial hydrolysis which forms an amorphous insoluble hydrated oxides, the improvement comprising the steps of adding to the semiconductor-halogen containing compound when in liquid condition prior to performing the partial hydrolysis, a metal halide wherein the halide is selected from the group consisting of chlorine, bromine and iodine, and the metal is selected from the group consisting of aluminum and titanium, said halide being soluble in said liquid semiconductor-halogen compound and having a pyrolytic dissociation temperature higher than that of the semiconductor-halogen containing compound, said halide being more readily hydrolyzable than the semiconductor-halogen containing compound, partially hydrolyzing the mixture, passing a carrier gas into the purified liquid semiconductor-halogen containing compound, whereby a pyrolytic reaction gas mixture is formed, and passing said reaction gas mixture without further purification into a reaction vessel.

7. In the method of producing a semiconducting element, selected from the group consisting of silicon and germanium, by pyrolytic dissociation and precipitation of a gasified halogen containing compound of the same element, the steps of adding about 0.1 mole of pre-purified titanium tetrachloride to one mole of the semiconductor-halogen containing compound, subjecting the resulting mixture to the action of a humid inert gas for about 10 minutes, separating the resulting hydroxide precipitate to leave a purified standard solution, adding from between about $\frac{1}{1000}$ to about $\frac{1}{10,000}$ part of said purified standard solution to each part of semiconductor-halogen containing liquid to be pyrolytically precipitated whereby said semiconductor-halogen containing liquid is purified, passing a carrier gas into the purified liquid semiconductor-halogen containing compound, whereby a pyrolytic reaction gas mixture is formed, and passing said reaction gas mixture without further purification into a reaction vessel.

8. In the methold of producing a semiconducting element, selected from the group consisting of silicon and germanium, by pyrolytic dissociation and precipitation of a gasified halogen containing compound of the same element, the steps of adding about 0.1 mole of pre-purified aluminum bromide to a mole of the semiconductor-halogen containing compound, subjecting the resulting mixture to the action of a humid inert gas for about 10 minutes, separating the resulting hydroxide precipitate to leave a purified standard solution, adding from between about $\frac{1}{1000}$ to about $\frac{1}{10,000}$ part of said purified standard solution to each part of semiconductor-halogen containing liquid to be pyrolytically precipitated whereby said semiconductor-halogen-containing liquid is purified, passing a carrier gas into the purified liquid semiconductor-halogen containing compound, whereby a pyrolytic reaction gas mixture is formed, and passing said reaction gas mixture without further purification into a reaction vessel.

References Cited in the file of this patent

UNITED STATES PATENTS

| 2,821,460 | Whelan | Jan. 28, 1958 |
| 2,981,605 | Rummel | Apr. 25, 1961 |

FOREIGN PATENTS

| 627,904 | Great Britain | Aug. 18, 1949 |

OTHER REFERENCES

"Preparation of Single Crystals," by Lawson and Nielson, page 241, 1958 ed., Buttersworth Scientific Publications, London.